Jan. 15, 1957 A. U. KHAN 2,777,496
FASTENER SECURED TO STRIP BY STAKING
Filed Dec. 22, 1955
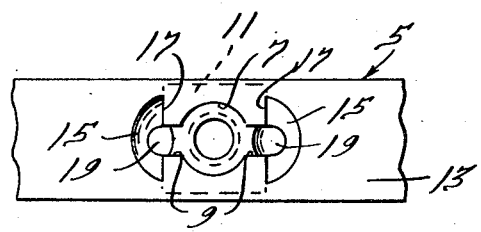
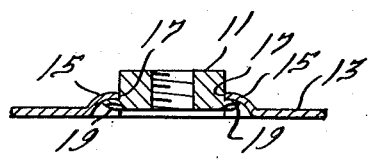
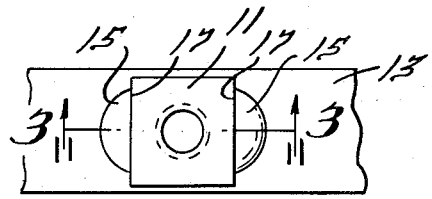
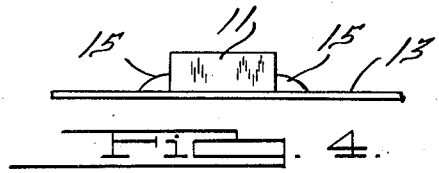
INVENTOR.
BY
Harness, Dickey & Pierce
ATTORNEYS.

2,777,496

Patented Jan. 15, 1957

United States Patent Office

2,777,496

FASTENER SECURED TO STRIP BY STAKING

Aman Ullah Khan, St. Joseph, Mich., assignor to Prestole Corporation, Toledo, Ohio, a corporation of Michigan Application December 22, 1955, Serial No. 554,878

1 Claim. (Cl. 151—41.72)

This invention relates generally to fasteners, and more particularly to a sheet metal fastener adapted for use in connecting one part to another.

It is an object of this invention to provide a multi-thread sheet metal fastener which is relatively inexpensive to manufacture, durable in construction, and which will withstand the necessary torque loads applied thereto when a stud or the like is connected therewith.

It is a still further object of this invention to provide a fastener of the aforementioned type which includes a sheet metal strip, a multi-thread nut, and a novel and improved means for connecting the nut with the strip so as to prevent any substantial relative rotation or movement between the strip and the nut.

These and other objects of this invention will become apparent from the following detailed description taken in conjunction with the accompanying drawing, in which:

Figure 1 is a bottom elevational view of a fastener of this invention;

Fig. 2 is a top plan view of the structure illustrated in Figure 1;

Fig. 3 is a sectional view taken along the line 3—3 of Fig. 2; and

Fig. 4 is a side elevational view of the structure illustrated in Figs. 1 to 3.

Referring now to the drawing, it will be seen that the fastener includes a sheet metal strip 5 having an aperture 7 therein and slots 9 extending from opposite sides of said aperture. A polygonally shaped nut 11 engages the upper face 13 of the strip. Projections or extrusions 15 are formed in the strip 5 and extend upwardly or away from the strip face 13. The projections 15 have edge portions 17 which engage the side edges of the nut 11 so as to prevent rotation of the nut relative to the strip. The underside or lower face of the nut is staked or upset so as to provide integral projecting portions 19 which extend underneath the projections 15 and engage the underside thereof so as to prevent movement of the nut 11 upwardly or away from the strip 5.

In forming the fastener, the aperture 7 and slots 9 in the strip may be formed in one operation. The strip may be slit adjacent the edges of the nut 11 before the nut is positioned on the strip, and the projections formed by an extrusion or punch die so that the edge portions 17 will be spaced apart the proper distance so as to engage the nut 11 and prevent rotation of the nut relative to the strip. In certain smaller sizes of fasteners, it may not be necessary to slit the adjacent edges of the projections before the punching or extruding operation, but it will be appreciated that by slitting the metal, the edge portions 17 will be straight and will properly engage the nut 11. Thereafter, the nut may be positioned on the top face 13 of the strip and the underside of the nut engaged by a staking tool or the like so as to cause the metal to flow underneath the projection 15, thereby retaining the nut in assembled relationship with the strip.

It will be appreciated that the fastener illustrated herein may take different shapes, and the strip may be flat or may have one end thereof bent so as to extend underneath the nut to provide the familiar U or J shaped type fasteners. The fastener of this invention is of the multi-thread type and is relatively inexpensive to manufacture, and the nut is retained against any substantial movement relative to the strip and is capable of withstanding the necessary torque which will be applied thereto when a stud or other threaded fastener is threaded into the nut to interconnect two desired parts.

What is claimed is:

1. A fastener including an elongate relatively narrow sheet metal strip having an aperture therein, said strip having a pair of slits extending transversely of the strip on opposite sides of the aperture therein and terminating in inwardly spaced relationship with respect to the longitudinal edges of the strip, portions of the strip longitudinally outwardly of the slits being bent upwardly to form a pair of dome-like projections each of which terminates at its inner edge in a plane extending generally perpendicular to the plane of said strip, and a polygonal nut having opposed walls and an internally threaded aperture, said nut engaging one face of said strip at a position intermediate the slits in said strip with the internally threaded aperture in the nut aligned with the aperture in said strip, said edges of said dome-like projections being spaced apart in the direction of the length of said strip substantially the same distance as the distance between said opposed walls of said nut and engaging said opposed walls of said nut to prevent any substantial relative rotation between said nut and said strip, the aperture in said strip extending outwardly in the direction of the length of said strip on opposite sides of the aperture in the nut and communicating with the space beneath the dome-like projections, said nut having integral staked portions aligned with the aperture in said strip and partially sheared from the nut so as to project outwardly from the central portions of said opposed walls into the space beneath said dome-like projections to engage the underside of said dome-like projections and retain said nut in assembled relationship with said strip.

References Cited in the file of this patent

UNITED STATES PATENTS

| | | |
|---|---|---|
| 1,014,684 | Weygand | Jan. 16, 1912 |
| 1,272,919 | Crawford | July 16, 1918 |
| 1,852,978 | Mitchell | Apr. 5, 1932 |
| 1,872,385 | Andren | Aug. 16, 1932 |
| 2,335,593 | Howe | Nov. 30, 1943 |
| 2,455,145 | Swanstrom | Nov. 30, 1948 |
| 2,631,634 | Tinnerman | Mar. 17, 1953 |

FOREIGN PATENTS

| | | |
|---|---|---|
| 503,900 | Great Britain | Apr. 17, 1939 |